May 25, 1926.

E. E. HUFFMAN

LIQUID LEVEL INDICATING DEVICE

Filed May 27, 1922

1,586,200

INVENTOR

E. E. Huffman

Patented May 25, 1926.

1,586,200

UNITED STATES PATENT OFFICE.

EDWIN E. HUFFMAN, OF ST. LOUIS, MISSOURI.

LIQUID-LEVEL-INDICATING DEVICE.

Application filed May 27, 1922. Serial No. 564,172.

My invention relates to a device for indicating at the point either adjacent to or remote from a liquid container, the depth or quantity of liquid contained therein, said device being of the general type described in United States Reissue Patent No. 14,728 and Patent No. 1,396,844.

As explained in the last mentioned patent, when the device is used to indicate the gasoline level in automobile tanks there is a slow absorption or chemical reaction between the elements of gasoline and the air which in the course of a few months permits the gasoline level in the compensating chamber to rise high enough to affect the operation of said chamber in compensating for temperature changes unless said chamber is periodically drained by the removal of the drain plug.

One object of the present invention is to provide specific means for automatic restoration of air to the compensating chamber and another object of the invention is to provide simple and accessible adjusting means in the indicating instrument whereby a single instrument may be readily adjusted for use with the liquid containers of different depths, and without the necessity of access to the interior of the instrument case.

Figure 1:
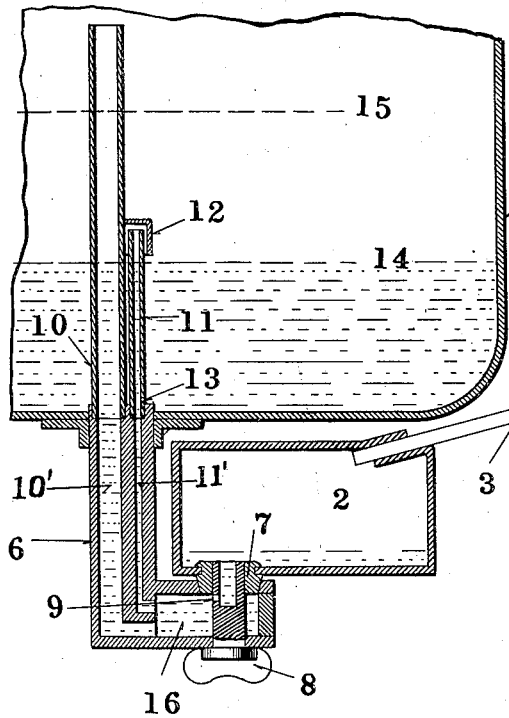
Figure 2:
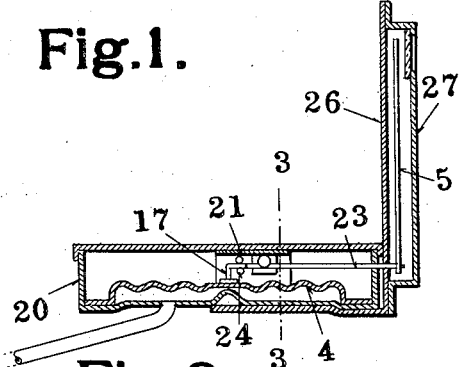
Figure 5:
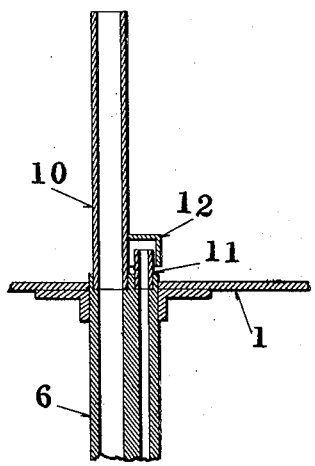
Figure 3:
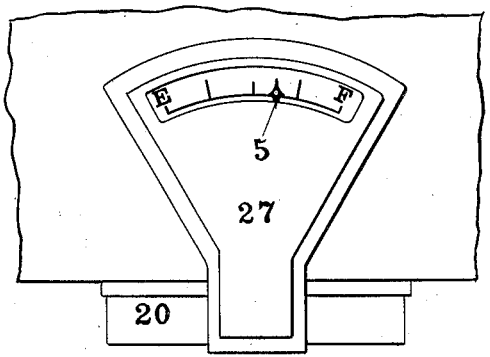
Figure 4:
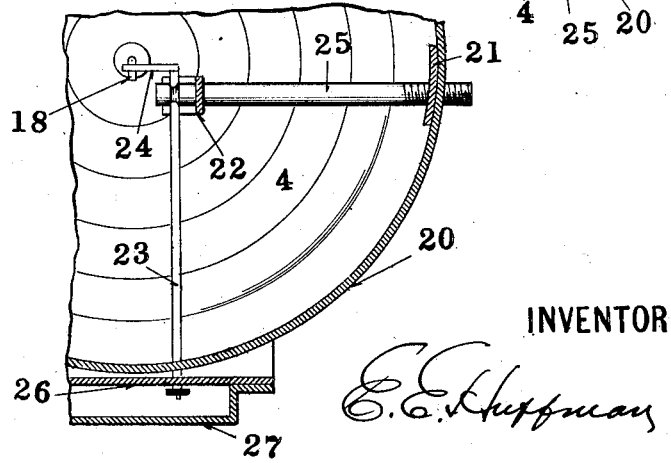

In the accompanying drawings illustrating my invention, Figure 1 is a sectional view showing an indicating instrument and the cooperating parts in connection with a liquid container; Figure 2 is a front elevation of the indicating instrument showing a section of the instrument board of an automobile to which it may be applied; Figure 3 is a vertical cross sectional view along the line 3—3 of Figure 1; Figure 4 is a horizontal cross sectional view along the line 4—4 of Figure 3; and Figure 5 is a fragmentary view showing a modification in the tank connecting means shown in Figure 1.

1 represents a gasoline tank beneath which is located a temperature compensating air chamber 2 connected by means of pipe 3 to the indicating instrument which comprises a flexible diaphragm 4 of German silver or other suitable material and an indicator hand 5. The function of the chamber 2 is described in the patents hereinabove referred to.

The chamber 2 communicates with the gasoline tank by means of the connection member 6 which is threaded into a flanged opening into the tank. The tapered plug 7 attached to the bottom of the compensating chamber seats in a tapered opening in the horizontal extension of the connecting member 6 and is held in position by the plug 8 which has threaded connection with the plug 7. This plug 8 is hollow at the upper end as shown and connects by means of a small opening 9 with the chamber 16 formed in a horizontal extension of the connecting member 6. This member 6 is provided with two passages 10' and 11' as shown which connect with the chamber 16 and through it communicate with each other. One of these passages is preferably made of considerably larger diameter than the other. As shown in the drawings, tubes 10 and 11 are connected to and form extensions of the large and small passages 10' and 11' respectively in the member 6. An air bell or chamber 12 having its bottom open embraces the upper end of the tube 11 in such manner that air in this chamber when under pressure resulting from rise of level of gasoline in the tank above the level of the chamber 12 must be forced downward into the tube 11. A very small opening 13 is provided through the wall of the tube 11 and this opening may instead be located in the wall of the tube 10. The tube 10 terminates at a point considerably higher than tube 11 and the air trapping chamber 12.

The apparatus so far described embodies means for automatically conveying air to the compensating chamber 2 and operates as follows:

The normal level of liquid in the compensating chamber 2 is substantially as indicated in the drawing. If the liquid level in the tank is at or below the dotted line 14, the air chamber 12 will be filled with air. The rise of this liquid level from the line 14 to, for instance, the line 15, may result either from the operation of filling the tank or from the momentary increase of level in the portion of the tank occupied by the tubes 10 and 11 when the automobile on which the tank is mounted is moving in a turn. So long as the liquid level is not above the top of the tube 10 liquid can enter this tube only through the top of the tube 11 (neglecting for the moment the very small rate at which liquid may enter through the opening 13). Therefore, in order that the hydrostatic balance be restored, liquid will enter the top of the tube 11 until sufficient liquid has passed in to raise the level in 10 to that existing in the tank but in order for liquid to enter the tube 11 it must force ahead of it and into the tube 11 the air which is trapped in chamber 12.

This air upon reaching the lower end of the passage of which tube 11 forms a continuation, will, of course, rise to the top of the chamber 16 in the connecting member 6 and from this point ultimately pass into the compensating chamber through the opening 9 in plug 8.

The purpose of the opening 13 in the apparatus shown in Figure 1 is to permit registration of the pressure due to the depth of liquid above it when the liquid level is below the top of tube 11 and is therefore preferably located adjacent to the bottom of the tank in order that the indicator may register the true depth even when less than the limit just indicated. The opening 13, however, is so small that liquid does not pass through it rapidly enough to prevent the operation of the air restoring means as above described either when the tank is being filled or the change of level is due to the swaying of the liquid in the container. Air forced down through tube 11 does not escape through 13 but continues downward to 16, this being due to the small diameter of 13 and the capillary resistance to displacement of liquid therefrom. Moreover the pressure on the air in the tube while it is adjacent to the opening 13 is not greater than the liquid pressure in the tank at 13 and tending to force liquid through 13 into the tube 11.

In Figure 5, the air chamber 12 is shown nearer the bottom of the tank and the apparatus without such an opening as 13 will therefore register all of the depth of the liquid except the short depth below the top of tube 11. However, it may happen that an automobile user would never allow the gasoline level to get so low as to permit any restoration of air to the chamber 12 and it is for this reason that it is preferably positioned higher and preferably as much as two inches above the bottom of the tank as indicated in Figure 1.

It will be understood that the compensating chamber may be located inside the liquid container as shown in Patent No. 1,396,844 hereinabove referred to, with the tubes 10 and 11 communicating with it in the same manner as herein described.

The indicating instrument comprises a closed chamber which communicates with the compensating chamber 2 by means of the tube 3. One wall of this closed chamber is formed by a cylindrically corrugated flexible diaphragm 4. To the center of this diaphragm is attached a pin 17 which has a horizontal bend or extension 18 as shown. Within the case 20 of the instrument is positioned a plate 21 having the downward extensions within the wall of the case, said plate extending across the interior of the case and over the central portion thereof. A portion of the metal of this plate is struck down and bent to form a bearing member 22 for the indicator shaft 23. Attached to this shaft 23 or integral with it is a forked lever 24 at right angles to the shaft, the forked portion embracing the horizontal extension 18 of the pin 17 attached to the diaphragm.

The adjusting pin 25 extends through the wall of the casing as shown, having threaded connection therewith, and through the bearing member 22. The inner end of this pin is provided with a circular groove embracing the upper part of the shaft 23 at a point where this shaft passes over and rests upon the horizontal extension of the bearing member 22. The shaft 23 passes through the case and through the main supporting plate 26 to which the diaphragm case is attached and which carries the indicating scale and the indicator cover 27. The indicator 5 is attached to the end of the shaft 23. The opening in the case or supporting plate 26 forms a second bearing for the shaft.

The adjusting apparatus just described is useful in the manufacture of instruments since there is frequently a slight variation in flexibility of a quantity of diaphragms made by the same manufacturing processes and is further useful in that a single instrument may be adjusted to cause the indicator to stand at the empty line and the full line when these conditions occur whether the tank be ten inches or eight inches deep, for example. This adjustment is really made from the exterior of the case by turning the pin 25 with a screw driver which turning causes a motion of the shaft 23 at the end nearest the diaphragm pin 17 and thus increases or decreases the effective length of the lever 24, whereby the same extent of diaphragm motion may be caused to produce different extents of motion of the end of the indicator 5.

Having fully described my invention what I claim as new and desire to secure by Letters Patent of the United States is:

1. In an apparatus of the class described, the combination of a liquid container, pressure responsive means for indicating the depth of liquid therein, pressure transmitting connecting means extending from said pressure responsive means to the container and provided with an opening whereby liquid from the container may enter it at a point below the level of liquid therein, means whereby air will be entrapped by the liquid when it rises to a predetermined level and means whereby rise of liquid in the container above such level causes said trapped air to be conveyed to a lower level for delivery to the pressure transmitting means.

2. In an apparatus of the class described, the combination of a liquid container, pressure responsive means for indicating the depth of liquid therein, pressure transmitting connecting means extending from said pressure responsive means to the container, means within the container for trapping air, and means whereby rise of liquid in the container from a predetermined level to a second predetermined level above the air trapping means causes said trapped air to be conveyed to a lower level for delivery to the pressure transmitting means, said means comprising two vertical tubes one of which communicates with the air trapping means, said tubes communicating with each other at their lower ends and one being provided with a small opening below the level of the air trapping means, and connecting the transmitting means with the interior of the liquid container.

3. In apparatus of the class described, the combination of a liquid container, pressure responsive means for indicating the depth of liquid therein, a compensating chamber connected with the liquid container, a pressure transmitting conduit connecting the compensating chamber with the pressure responsive means, a liquid receiving chamber beneath the compensating chamber and connected therewith, a tube communicating with said liquid chamber and with the liquid container at the minimum level to be gaged, air trapping means communicating with the upper end of the tube and with the liquid container at a point below the point of communication of said tube with said air trapping chamber, and a second tube communicating at its lower end with the aforesaid liquid receiving chamber and extending above the level of the air trapping means.

In testimony whereof, I have hereunto set my hand and affixed my seal.

EDWIN E. HUFFMAN. [L. S.]